United States Patent [19]
Cheshire, Jr.

[11] Patent Number: 5,255,468
[45] Date of Patent: Oct. 26, 1993

[54] INSECT ATTRACTING AND CAPTURING APPARATUS

[75] Inventor: Joseph M. Cheshire, Jr., Riverdale, Ga.

[73] Assignee: Bugvac U.S.A., Inc., Atlanta, Ga.

[21] Appl. No.: 736,235

[22] Filed: Jul. 26, 1991

[51] Int. Cl.$^5$ .............................................. A01M 1/04
[52] U.S. Cl. ...................................... 43/113; 43/112
[58] Field of Search ........................ 43/112, 113, 139

[56] References Cited

U.S. PATENT DOCUMENTS

| | | | |
|---|---|---|---|
| 1,693,368 | 11/1928 | Cherry . | |
| 2,806,321 | 9/1957 | Blackman | 43/139 |
| 2,931,127 | 4/1960 | Mayo | 43/139 |
| 3,041,773 | 7/1962 | Gagliano | 43/139 |
| 3,152,420 | 10/1964 | Pawl | 43/139 |
| 3,196,577 | 7/1965 | Plunkett | 43/113 |
| 3,319,374 | 5/1967 | Gawne | 43/113 |
| 3,987,578 | 10/1976 | Rueff | 43/113 |
| 4,182,069 | 1/1980 | De Yoreo | 43/112 |
| 4,523,404 | 6/1985 | DeYoreo | 43/113 |
| 4,908,978 | 3/1990 | Zacharias | 43/111 |
| 4,951,414 | 8/1990 | Mewissen | 43/112 |
| 5,014,460 | 5/1991 | Patti et al. | 43/113 |
| 5,020,270 | 6/1991 | Lo | 43/113 |

FOREIGN PATENT DOCUMENTS 1484369  1/1924  Italy .

OTHER PUBLICATIONS

Richard W. Fay; "A Modified Visual Trap for Aedes Aegypti": Mosquito News; Mar., 1970; pp. 20-23.

Donald P. Wilton; "Mosquito Collections in El Salvador With Ultra Violet and CDC Minature Light Traps With and Without Dry Ice"; Mosquito News, Dec. 1975; pp. 522-525.

D. P. Wilton et al.; "Air Flow Direction and Velocity in Light Trap Design"; Ent. exp. and appl. 15 (1972); pp. 377-386.

D. P. Wilton, et al.; "Responses of Adult Anopheles Stephensi to Light to Various Wave Lengths"; J. Med. Ent.; vol. 9, No. 4; pp. 301 α 304.

Advertisement—"Don't Squash Bugs. Vacuum Them Away"; Item No. FVM701; Jun. 1989; p. 24.

Advertisement—"Extraordinary Solutions for Ordinary Problems"; Remington Bug Suckers; Order No. 5943; Fall, 1989, p. 36.

M. W. Service, Mosquito Ecology; 1976; pp. 338-361.

W. O. Hauff, et al.; "Design and Efficiency of Mosquito Traps Based on Visual Response to Patterns"; The Canadaian Entomologist; Feb., 1960; pp. 127-132.

Roger S. Nasci; "Failure of an Insect Electrocuting Device to Reduce Mosquito Biting"; Mosquito News; Jun., 1983; pp. 180-181.

John D. Sexton, et al.; "Comparison of an Experimental Updraft Ultraviolet Light Trap With the CDC Miniature Light Trap and Biting Collections in Sampling for Anopheles Albimanus In Haiti"; J. Am. Mosq. Control Assoc., Jun. 1986; pp. 168-173.

Primary Examiner—Kurt C. Rowan
Attorney, Agent, or Firm—Jones & Askew

[57] ABSTRACT

An insect attracting and capturing apparatus particularly suitable for capturing and killing mosquitoes. The apparatus has a light source for attracting insects. A fan establishes an air current into an insect receiving opening, and establishes turbulent air flows in the vicinity of the apparatus. An air flow directing flange directs air into the insect receiving opening and into the fan. The insect receiving opening leads to a narrow channel that directs air into the fan. Insects having an upward flight reflex to sensed changes in air flow direction and/or velocity will detect the air flow created by the fan, fly upwardly, and be captured in the air flow. An electrified grid is provided inside the passageway for electrocuting admitted insects. The position of the electrified grid inside the channel and in the inward air flow muffles sound from electrocution of insects. One embodiment uses ultraviolet light as an attractant, and another embodiment uses light, heat and motion to attract insects. The apparatus has the appearance of a conventional outdoor lighting fixture, and therefore is aesthetically attractive and relatively quiet compared to conventional insect electrocution devices.

12 Claims, 5 Drawing Sheets

INSECT ATTRACTING AND CAPTURING APPARATUS

TECHNICAL FIELD

The present invention relates generally to insect attracting and capturing apparatus such as insect traps, and more particularly relates to an insect trap and exterminating device particularly suitable for use in attracting and killing harmful weak flying insects such as species of Anopheles and Aedes mosquitoes.

BACKGROUND OF THE INVENTION

There are many known devices designed to attract and capture and/or kill insects. Devices for trapping insects for research purposes are typically referred to as "traps", while devices that also kill the insects have various names, including the colloquial terms "bug killer" and "bug zapper". The motivation for the latter devices is generally to destroy insects that are pests to humans, such as members of the Anopheles and Aedes species of mosquitoes, which are both known to be disease carriers.

Entomological research suggests that members of various species of mosquitoes are attracted to light in various wavelengths. It is well known that light attracts many types of insects, including mosquitoes, so most of the prior devices include a light source as an attractant or lure. Such devices sometimes take advantage of the discovery that some species of mosquitoes are attracted to light in a range of ultraviolet (UV) wavelengths, and possibly certain infrared wavelengths. Fluorescent lights, sometimes with special phosphors to enhance the ultraviolet spectral content of the emitted light, are often used as the light source, but some older devices relied upon incandescent bulbs.

Some prior art light-attractant devices also included a fan, with the fan typically designed to establish a sufficiently large air current such that any insect that approaches the light lure closely to the air intake will be irretrievably caught in the air flow and pulled into the device. Thus, some prior art devices included a light as an attractant, a fan to pull insects into the device, and either a trap for holding the insects, an electric grid to kill the insects, or simply a plate to kill them on impact, for example, see U.S. Pat. Nos. 2,806,321, 3,041,773 and 3,152,420. U.S. Pat. No. 4,908,978 discloses a device that includes a fan and an electric grid, but has no light or other attractant.

Various types of insect traps, such as the New Jersey trap, the CDC trap, the Nozawa trap, etc., have been used by researchers to capture different species of mosquitoes and preserve the catch for research purposes. Many of these traps have light lures and are thus considered "light traps." Common designs include a light source positioned over a vertically disposed air intake, a screen to exclude larger insects, a fan to draw air down into the air intake, a collection bottle or bag, and a flat, concave, or conical metal or plastic cover placed above the trap to protect it from rain. Variations of the design include downwardly facing openings for bottom draft intake, since research suggests that updraft-type traps may be more effective in some instances than downdraft types.

Other prior art devices do not include a fan, and depend solely on the light to attract the insects and draw them in. The currently popular commercial "backyard" insect electrocution devices use an electric grid to kill insects but do not include a fan. The most common arrangement is to provide a light source for attracting insects (typically UV) and spaced apart electric current-carrying grids surrounding the light source. Insects attempt to reach the light source and are killed by the electrified grids, which are typically spaced such that smaller insects cannot avoid touching or coming within operative proximity of the electrodes if they approach the light lure.

Many UV-lure electrocution devices are touted as being able to clear an area of mosquitoes up to a certain number of square feet or acres. Curiously, however, research has shown that these UV-lure devices are ineffective to reduce mosquito biting. The research suggests that such devices actually increase the count of biting female mosquitoes within the general vicinity of the device. The overall effect of the device may be to attract more biting insects to an area having an UV-lure device than an area without such a device. Some of the increased biting population will be electrocuted, but many will be diverted by the more compelling lure of human bait in the area. Since humans are known to be more attractive to mosquitoes than UV lures, the research suggests an increased bite rate for yards having a conventional UV-lure electrocution device than yards without them.

Further research suggests that mosquitoes have a reflexive defensive reaction to the detection of minute changes in air flow velocity and/or direction. Upon encountering a change in air flow velocity and/or direction, such as is produced in the vicinity of insect traps and electrocution devices having fans, mosquitoes react by vigorous flight activity, with a strong lift component, ostensibly in an effort to avoid entrainment. Since mosquitoes are known to have extremely sensitive senses for warm blooded food sources, it may be expected that their sense for air currents is also very sensitive. It is possible that mosquitoes actually can avoid being pulled into conventional traps and electrocution devices having fans, by sensing the changes in air flow velocity and/or direction prior to being captured in a strong air flow. Therefore, areas utilizing such traps or devices may have a higher concentration of biting insects than areas without them.

Research also suggests that if a trap is of a conventional downdraft type with a fan, its air stream must overcome the lift factor in the mosquito's flight in order to capture the insect. If the trap creates an upward moving air stream, however, a mosquito's upward flight reaction contributes not to its escape, but to capture. Thus, some insect trap designs include a downwardly facing opening for a fan air intake, for creating an updraft.

In experiments involving comparisons between updraft and downdraft-type type traps, it was believed that the sustained captures by an updraft and the lowered catches of a downdraft trap when the air flow rates were reduced confirms the upward flight reaction by a mosquito to air movement. However, it was also observed that insects that managed to avoid being drawn into the trap characteristically escaped by flying upward and collected under the trap's rain cover, where they made continual attempts to fly higher. Accordingly, insect traps having rain covers positioned over an upwardly facing air intake tend to accumulate uncaught insects under the cover.

Other drawbacks to conventional UV-lure electrocution devices include the indiscriminate killing of non-pestiferous insect species. Species of insects which are "strong fliers" or those which have high body masses fly fast towards a lure and are unable to stop before encountering the electric grid. Beetles, by way of example, will be killed by electrocution devices, but beetles are not particularly dangerous pests to people.

Moreover, most electrocution devices tend to be noisy and aesthetically unappealing to many people. Many people believe that the crackling and sizzling sound that accompanies the electrocution of an insect is an indication of its effectiveness. However, a recent study showed that the vast majority (over 90%) of the insects killed by electrocution devices were not mosquitoes, with only about 3% being female mosquitoes. Other people find the noise from the device quite unappetizing.

Accordingly, there is a need for an insect killer that is relatively quiet, aesthetically appealing, and effective to attract, capture, and kill species of insects that are harmful to people, especially species of mosquitoes.

SUMMARY OF THE INVENTION

The present invention overcomes many of the problems with prior art traps and killing devices by taking advantage of the upward flight reaction of certain insect species, especially mosquitoes, to sensed changes in air flow direction and/or velocity. Briefly described, the present invention comprises an insect attracting and capturing apparatus having a body and means for attracting insects to the vicinity of the body. Preferably, the attracting means comprises a light source. In a preferred embodiment, means defining a generally horizontal insect-receiving opening is provided in the outer surface of the body, with the opening having an upper edge and a lower edge. The opening extends into the interior of the body.

A fan is positioned within the body for creating an air flow outside the body in the vicinity of the opening, and for drawing air in through the opening and into a narrow passageway. Air flow directing means affixed to the body proximate to the upper edge extends outwardly from the body to an outer rim, for capturing upwardly flying insects in the air flow and directing the insects into the opening. Preferably, the air flow directing means is a continuous surface extending into the body, without a region that might allow insects to congregate.

In devices configured for killing the insects, oppositely polarized electrical conductors are provided inside the insect receiving opening, spaced apart a distance such that insects caught in the air flow will cause the conductors to arc and be electrocuted. The conductors are positioned radially inwardly from the opening so that sounds from insect electrocution are muffled.

More particularly described, a preferred embodiment of the present invention includes an annular slot positioned between the attracting means and the air flow directing means, with the slot constituting the insect receiving opening. The air flow directing means defines the upper edge of the slot, and extends outwardly of the housing adjacent to the slot. The air flow directing means comprises an annular ring extending circumferentially about the body and overhanging the opening.

Preferably, the insect-receiving opening leads into a channel or passageway having a substantially uniform height extending from the opening to a position immediately above the fan. The air flow directing means preferably comprises a substantially continuous surface extending from the outer rim to a position immediately above the fan, and defines the upper surface of the channel. In this manner, insects drawn into the opening are presented with no area for accumulation and avoidance of capture.

If insect killing is desired, electrocution means are positioned in the channel for electrocuting insects passing through the channel. Preferably, the channel is sized so as to admit (and electrocute) insects of a size of mosquitoes and the like, but to exclude larger insects. Such a channel size allows greater discrimination between species of insects killed.

Since it is well established that mosquitoes are attracted to light sources, and especially ultraviolet (UV) wavelengths, the attracting means will preferably comprise a UV light source. Typically, the light source will be a circular fluorescent bulb, mounted in a clear enclosure immediately below the insect-receiving opening, with UV-wavelength enhancing phosphors. A plate is positioned above the light source for defining the lower edge of the opening, and the insect electrocution means, if utilized, may be positioned between the air flow directing means and the plate.

Still more particularly described, the fan is preferably positioned within a lower portion of the body and will be operative for generating a current of air downwardly through the lower portion. The fan exhausts through the bottom of the body, discharging any insect remains. For pure trapping applications, a collection bottle or bag may be positioned to receive the catch. The effect of the fan is to generate a second current of air, in a radially inwardly direction, through the insect receiving opening and into the fan.

In an alternative embodiment, the attracting means comprises a light source and motion means. The disclosed motion means comprises a rotatable sleeve mounted axially of the body, and means are provided for rotating the sleeve. An electric grid surrounds the rotatable sleeve for electrocuting insects, and the light source is positioned within the rotatable sleeve. In this alternative embodiment, the fan is mounted above the light source, and the rotatable sleeve includes a plurality of slits defined therein. Air flow from the fan passes through the slits and causes rotation of the sleeve. The alternative embodiment, like the first embodiment, take advantage of the upward flight reflex of mosquitoes, by capturing upwardly flying mosquitoes in a strong air current.

The present invention provides for establishing an air flow sufficiently strong to capture weak flying insects, at least in part by setting up air turbulence in the vicinity of the light. Insects such as mosquitoes having an upward flight response to changes in air flow will fly upwardly and be captured in the strong inwardly-directed air flow created by the fan through the insect receiving opening. Such insects will not be able to escape by virtue of the air flow directing means and strong air flow, and will be either captured or killed, depending upon the application.

Accordingly, it is an object of the present invention to provide an improved insect attracting, capturing and killing apparatus, particularly effective for capturing and killing mosquitoes.

It is another object of the present invention to provide an insect attracting and capturing device that takes advantage of the upward flight reflex or response of insects such as mosquitoes to sensed changes in air flow direction and/or velocity.

It is another object of the present invention to provide an insect attracting and capturing device that prevents the escape of pestiferous insects such as mosquitoes which fly upwardly as a defense mechanism.

It is another object of the present invention to provide an insect attracting and capturing device that is quiet and effective.

It is another object of the present invention to provide an insect attracting and capturing device that is more aesthetically appealing to a broad spectrum of the population than noisy electrocution devices.

It is another object of the present invention to provide an insect attracting and capturing device that is more discriminate than prior art insect electrocution devices in the types of insects that it captures and kills.

It is another object of the present invention to provide an insect attracting and capturing device that takes advantage of the anticipated increased capture rates with updraft-type traps but including means for killing the insects.

It is another object of the present invention to provide an insect attracting and capturing device that includes a restricted channel or passageway leading from an insect intake to a fan, the size of channel being such that larger insects are excluded from entry into the device, admitted insects must necessarily pass through and come within proximity of spaced apart electrodes that will electrocute the insects, and there is no place for accumulation of insects above the fan.

It is another object of the present invention to provide an insect attracting, capturing, and killing apparatus that is quieter in operation due to the position of electrocuting means inside a narrow passageway a distance from an insect receiving opening, with an inward air flow direction, all of which combine to muffle the sound caused by electrocution of insects.

These and other objects, features and advantages of the present invention will become apparent from consideration of the following detailed description of the disclosed embodiments and by reference to the accompanying drawings and claims.

DETAILED DESCRIPTION OF THE EMBODIMENTS

Figure 1:
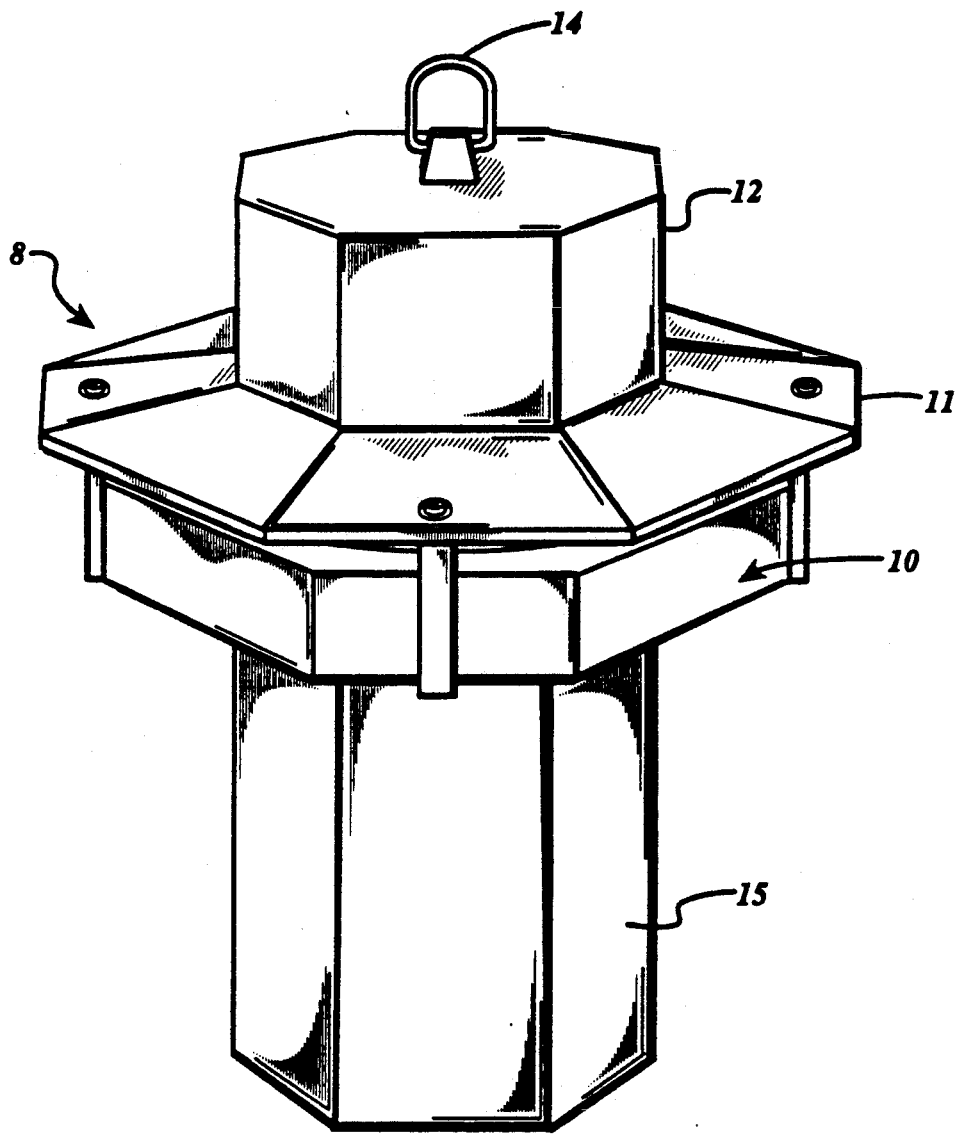
FIG. 1 is a perspective view showing the preferred embodiment of the present invention.
Figure 2:
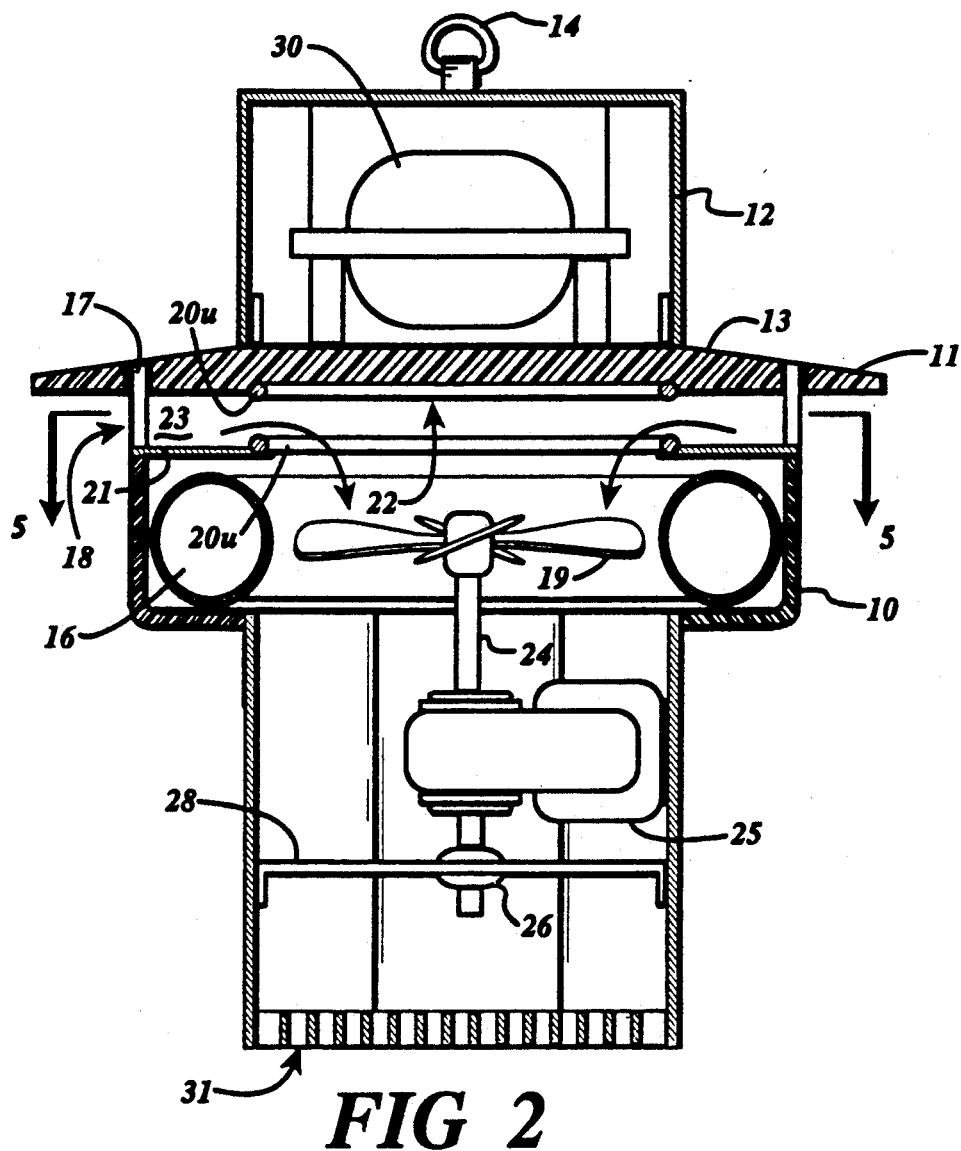
FIG. 2 is a longitudinal cross-sectional view through the apparatus shown in FIG. 1.

Referring now to the drawings, in which like numerals indicate like elements throughout the several views, FIG. 1 shows an electric insect attracting, capturing, and killing apparatus 8 having a body comprising an attractant portion 10, an upper housing 12, and a lower housing 15. A flange 11 extends a predetermined distance outwardly from the body of the device; the flange 11 is an extension of an annular flange plate 13. Preferably, the flange plate 13 is of a one-piece construction, with the flange 11 constituting an extension thereof. The flange 11 extends over the attractant portion 10 and serves not only as a cover, but, as will be seen, also as air flow directing means. Mounted to the flange plate 13 is an upper housing 12 which includes a mounting ring 14 by which the device may be suspended for use. Below the attractant portion 10 is a lower housing 15. As best seen in FIG. 2, there is an insect receiving port or opening 18 between the attractant portion 10 and the flange 11.

The attractant portion 10 includes a means for attracting insects to the vicinity of the apparatus. Since it is well known that insects of the type for which the present invention is particularly intended, namely, mosquitoes, are attracted to light, the preferred insect attracting means is a light bulb 16. The light in the preferred embodiment is a circular fluorescent bulb, positioned immediately below the insect receiving port 18 so that insects will be drawn closely to the area beneath the flange 11.

Referring now to FIG. 2, the attractant portion 10 is indicated as made of plastic. Preferably, the attractant portion 10 comprises a transparent or translucent material that serves as a cover for the light bulb 16 and prevents intrusion of moisture or insects except through the insect receiving port 18. The cover may be made of glass, preferably opalescent glass, but plastics are lighter in weight and easier to form to the desired shape. Numerous plastics are suitable for use in the preferred embodiment, including polymethylmethacrylate, polystyrene and polycarbonate; glass and acrylic may not meet Underwriters' Laboratories (UL) impact tests and acrylic may not meet UL flames test. Those skilled in the art will readily identify other materials that may be used, and the foregoing list is by way of example only.

As mentioned, within the attractant portion 10 there is a light source indicated at 16. The light source 16 here shown is a circular fluorescent tube. Other forms of light bulbs may be used, but a fluorescent tube is generally low power and light frequencies can be selected by utilizing different dyes or phosphors in the tube. One can simply change tubes 16 to select white light, ultraviolet light, or other color desired.

Preferably, the bulb 16 will include phosphors for enhancing the ultraviolet (UV) content of the light emitted by the bulb. For example, it is known that the *Anopheles stephensi* mosquitoes are especially attracted to UV light in the range of 290 to 365 nanometers (nm). Accordingly, it is expected that UV light in this general range will be effective to attract mosquitoes of this species.

However, it should be understood that other species of insects, including mosquitoes, have different sensitivities to light of various wavelengths. Those skilled in the art will understand that the attracting means may comprise light of wavelengths and/or intensities for attracting different species of insects by varying the nature of the attracting means, for example, by providing incandescent sources for some species, infrared sources for other species, and other UV wavelengths for yet other species.

It should also be understood that the light 16 may include significant content of wavelengths in the spectrum visible to humans. In this manner, embodiments of the preferred invention, while serving a principal purpose of attracting and capturing insects, may serve as attractive outdoor lighting fixtures. Because the housings 12, 15 may be opaque, and the attractant portion 10 includes a circular fluorescent bulb 16, the overall design of the apparatus 8 is aesthetically pleasing and not unlike that of a conventional outdoor lighting fixture.

The insect receiving opening 18 is preferably located in the space between the upper edge of the attractant portion 10 and the flange 11. Insects are urged into the apparatus 8 through the opening 18 by an air current established by a fan 19. The fan 19 is mounted inside the lower housing 15 in a vertical orientation, to establish an air flow inwardly through the opening 18 and downwardly through the lower housing 15.

Immediately inside the insect receiving opening 18, but preferably radially inwardly about 1 to 3 inches there is an electric grid 20, comprising an upper electrode 20$u$ and a lower electrode 20$l$, which are spaced apart in an amount sufficient to admit insect remains after electrocution. The electric grid is preferably formed of a pair of bare wires, approximately 0.06 inches in diameter, which are firmly affixed to their respective mounting surfaces. The wires are preferably formed into parallel, spaced apart hoops. The upper electrode 20$u$ is affixed to the underside of the flange plate 13, while the lower electrode is firmly affixed to the top of an annular lower plate 21. The electrodes are preferably recessed into the flange plate 13 and the lower plate 21, or are affixed by standoffs (not shown) or other insulating material so that electric current carried by the electrodes can not be carried to the housings. Preferably, the flange plate 13 and the lower plate 21 are fabricated of a nonconducting material such as PVC or polycarbonate, so that the electrodes can be fastened directly thereto.

The electrodes 20$u$, 20$l$ are preferably energized at 5000-7000 volts AC from a transformer 30 housed in the upper housing 12. This voltage is sufficient to kill insects such as mosquitoes that pass through the electrodes. The electric grid 20 preferably comprises only two spaced apart wire hoops, so insects of the size of mosquitoes and the like will come into sufficient proximity of both wires to cause arcing as they pass into the insect receiving opening 18, into the channel 23, and into the central opening 22 in the plate 21. This simple two-wire electric grid is preferable because insect remains are less likely to become stuck on the grid. Remains of the insects will continue in motion due to the air flow established by the fan 19 and be discharged through the fan.

The flange plate 13 extends completely across the body of the apparatus 8 between the upper housing 12 and the attractant portion 10. The flange plate is preferably an annular plate having a flat bottom and top, and includes mounting means (not shown) to which the upper housing is affixed. Spacers 17 are inserted through holes in the flange plate 13 to the plate 21 and support the flange plate and upper housing assembly in a spaced apart manner from the plate and lower housing assembly.

It will be seen in FIG. 2 that the flange plate 13 and the lower plate 21, both having substantially flat surfaces, define an annular passageway or channel 23 having substantially parallel walls, having an upper wall bounded by the flange plate 13 and a lower wall bounded by the lower plate 21. The passageway 23 leads to the interior of the apparatus 8 and there is no region on the inside of the device in which insects that somehow escape the electrode 20 can accumulate.

The lower plate 21 covers and protects the light source 16 and prevents insects from contacting the light. The plate 21 includes a central opening 22 radially inwardly of the electric grid 20. The central opening 22 is disposed directly above the blades of the fan 19, and defines an axial passageway through the lower housing 15 through the fan.

The fan 19 comprises blades mounted to a shaft 24 which is driven by a motor 25. The motor 25 is mounted at a vertical orientation in the lower housing 15, and an additional bearing support 26 is mounted to a strut 28 that extends across the lower housing 15. Preferably, the fan motor is a model 57 H2 manufactured by Uppco, Inc., of Chicago, Ill. The fan blade is preferably a model F4.4 CW5BL manufactured by Advanced Air International, Inc., Riviera Beach, Fla.

Because the fan runs continuously while the device is energized, fans mounted with a vertical orientation are expected to have a longer service life. However, it will be understood that the orientation of the fan is not critical to the operation of the invention.

The preferred fan is configured to run at about 2800 RPM, which in the disclosed embodiment establishes an air flow through the insect receiving opening 18 of about 45 cubic feet per minute (CFM) at an air flow velocity of about 750 feet per minute at the opening 18. Preferred air velocities are between about 260 feet per minute and about 1350 feet per minute, depending on the fan motor and blade, and the spacing between flange plate 13 and the lower plate 21. As will be described in greater detail below, the air velocity in the vicinity of the opening 18 is a factor to which attention should be directed. Preferably, the air velocity should be sufficient to capture insects having a body mass and strength similar to that of a mosquito should such an insect approach within about 1.5 inches in any direction of the opening 18. Those skilled in the art will therefore understand that the type of fan blade, RPM, motor power rating, and other factors contribute to the creation of this air flow.

It will also be understood that the fan, while it establishes a substantially laminar air flow along the surface of the flange 11, will establish turbulent air flows in the region generally outside the attractant 10 because of the shape of the device. The turbulent air flows are believed to be present all around the device, and these air flows will likely be sensed by mosquitoes and other insects. However, as will be understood, if the insect exhibits an upward flight reflex to these air flows, the likelihood is increased that the insect will move upwardly toward the insect receiving opening 18. Once an insect is sufficiently close to the opening 18, it will be captured in the air flow and cannot escape.

Below the motor 25, an exhaust louver 29 covers the open lower end 31 of the lower housing 15 for both aesthetic appeal and safety. The louver 29 allows smooth air flow through the body of the apparatus 8 and prevents a person from inadvertently contacting the fan 19. It will therefore be understood that the fan 19 blows down, axially of the lower portion 15, and this air movement causes air to be drawn into the opening 18, through the lower housing, and out through the louvers 29.

The preferred embodiment includes a dual purpose transformer 30, mounted in the upper housing 12. The transformer 30 both serves as ballast for the fluorescent light bulb 16 and also provides the high voltage for the electric grid 20. The preferred transformer 30 is a model FG-3973, 120 volt input, rated at peak 4800 volts output, 7 milliamps, manufactured by Actown-Electrocoil of Spring Grove, Ill. Other types of transformers, single purpose or multipurpose, are also suitable for use in the present invention. As here illustrated, the two functions of powering the light and energizing the electrodes are provided in one transformer, which saves weight and is preferable. If the dual function transformer is not available, a separate transformer and ballast can be used to achieve the same results.

With the foregoing description in mind, the operation of the device will next be described. The apparatus 8 is preferably suspended from the mounting ring 14 at a height of at least two feet and generally not more than about ten feet above the ground. Electric power is supplied through a conventional power cord (not shown) to energize the transformer 30 and the fan motor 25. The transformer 30 generates a high voltage on the two wires 20u, 20l of the grid 20, and causes the light source 16 to emit light. The light from the source 16 will pass through the attractant portion 10 and attract insects to the vicinity of the apparatus 8.

Mosquitoes, the group of insects for which the present invention is especially operative, will approach the attractant portion 10. Mosquitoes are known to be especially sensitive to changes in the velocity and/or direction of air flow, perhaps as a defensive mechanism to swatting by hosts. Upon approach within a predetermined distance from the device (which may vary from individual to individual, or from species to species), mosquitoes will begin to detect the air currents generated by the fan. The general response of the mosquitoes will be to fly upwardly.

In flying up, some insects will encounter the flange 11 and will be irretrievably caught in the inwardly flowing current of air established by the fan 19; these insects will be inexorably drawn into the device. Mosquitoes, being considered "weak flyers", will be unable to escape the air flow velocity of about 260 feet per minute once they are entrained. The insect will be confined in the passageway 23 and constrained to pass over the electric grid 20. The insects will be killed and their remains pass through the fan 19, through the lower housing 15, and out through the louver 29.

The exhaust air flow through the louvers 29 may contribute to triggering the upward flight reflex in mosquitoes approaching from beneath the device.

It should be understood that larger and strong flying insects may also be killed by the device of the present invention. If such insects approach the apparatus, are caught in the air flow, and cannot escape, they also will be drawn into the device and killed. Nevertheless, it is not expected that a large volume of larger and/or strong flying insects will be killed by the device because the narrow width of the opening 18 will exclude them and their strength will enable their escape. Therefore, the devices constructed in accordance with the present invention will not generate as much noise and noxious odor from insect electrocution as conventional backyard insect electrocution devices, which are less selective and kill many species of insects.

It will also be understood that the noise level in the present invention is reduced because of the recessed location of the electric grid 20, displaced inside the opening 18 a predetermined distance inwardly of the channel 23. This recessed placement tends to muffle the sounds because of the inward placement and the inward flow of air into the fan.

Figure 4:
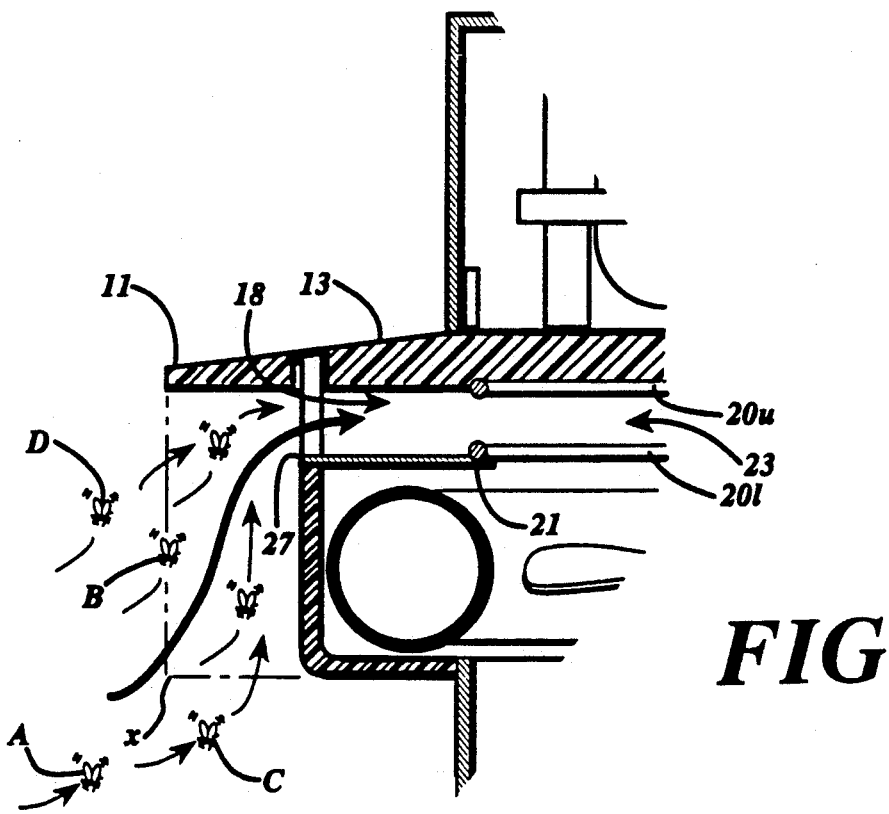
FIG. 4 illustrates the upward flight reflex of mosquitoes to sensed changes in air flow direction and/or velocity and the manner in which the embodiment of FIGS. 1 and 2 captures such upwardly flying insects.
Figure 5:
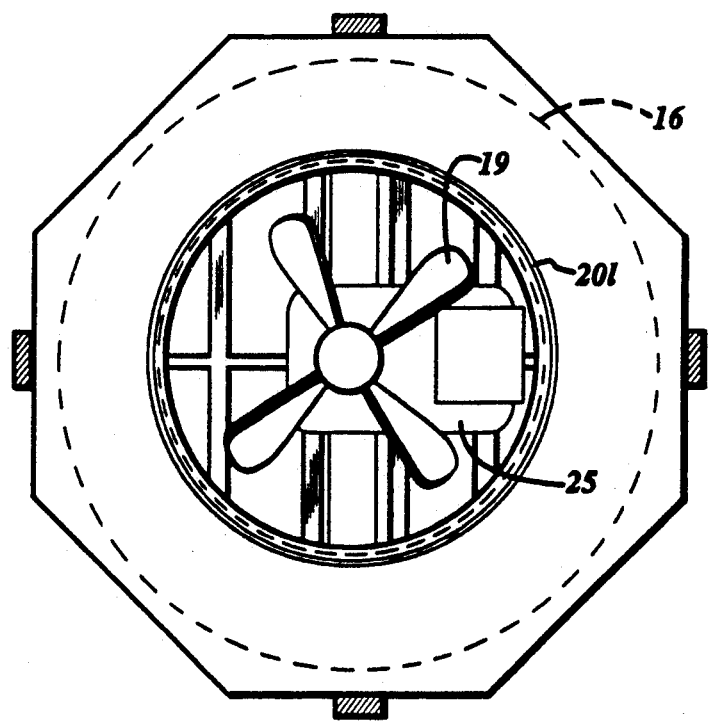
FIG. 5 is a cross sectional view taken through the line 5—5 of the embodiment shown in FIG. 2.
Figure 6:
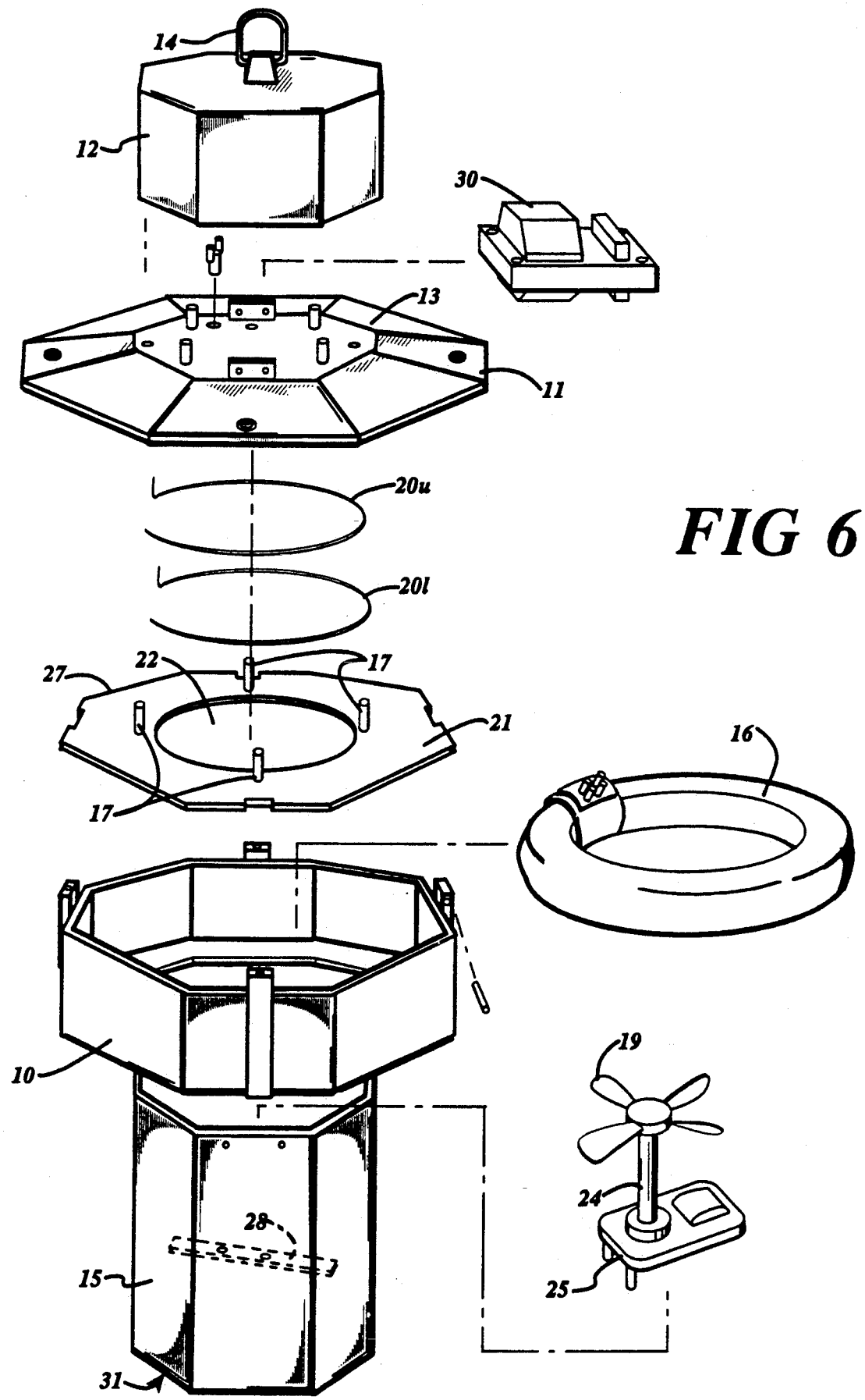
FIG. 6 is an exploded view of the preferred embodiment illustrated in FIG. 1.

Referring now to FIG. 4, next will be discussed the manner by which the present invention takes advantage of the upward flight reflex of mosquitoes to sensed changes in air flow direction and/or velocity. When coupled with a passageway 23 entrance area of about 8.75 square inches and fan rotation of about 2800 RPM, an average air velocity of about 750 feet per minute is established at the opening 18 in the preferred embodiment 8. It is believed that these parameters establish an air flow and/or disturbance within the region marked by the "X" in FIG. 4, sufficient to trigger the upward flight reflex in the mosquito and entrain the insect in the air flow into the opening 18. The point X is defined by an extension of a line down from the edge of the flange 11 and the lower edge of the attractant portion or light cover 10; the point X may also be considered to define the boundaries of a "killing zone". In the preferred embodiment, the point X is about 1.5 inches radially outwardly of the lower edge 27 of the lower plate 21.

It is believed that mosquitoes will begin to sense the air flow in a region around the apparatus 8 such as at the point A in FIG. 4, prior to entry into the killing zone. A mosquito such as indicated at A will generally begin its upward flight reflex immediately upon detecting this air movement. This upward flight reflex will cause the insect to reach the point B and enter the killing zone beyond the point X, from which there is no escape. Once the mosquito has entered the killing zone, it will be carried by the air current into the opening 18.

An insect which approaches the device from a low altitude, such as indicated at C in FIG. 4, will likely sense the air currents around the attractant portion 10, which may be turbulent, and respond with the upward flight reflex. This upward reflex will cause the insect to enter the killing zone and be captured by the air flow, which increases in strength closer to the opening 18.

An insect which approaches the device from a high altitude, such as indicated at D in FIG. 4, will generally be caught in the air flow immediately and carried into the opening 18. The air flow at D will generally be relatively strong (as compared to the points B, C, or X) because of the air flow directing effect of the flange 11. The flange 11 thus serves as air flow directing means, and establishes a substantially laminar air flow at high velocity along the lower surface of the flange 11.

It will be appreciated that the combination of the continuous surface of the flange plate 13 all the way from the flange 11 to the fan 19, the constricted spacing of the passageway 23, and the volume of air pull in by the fan 19, provides a construction and operation wherein the air flow is strong enough to pull mosquitoes into the opening 18 and wherein mosquitoes (dead or alive) have no space underneath the plate to accumulate.

Figure 3:
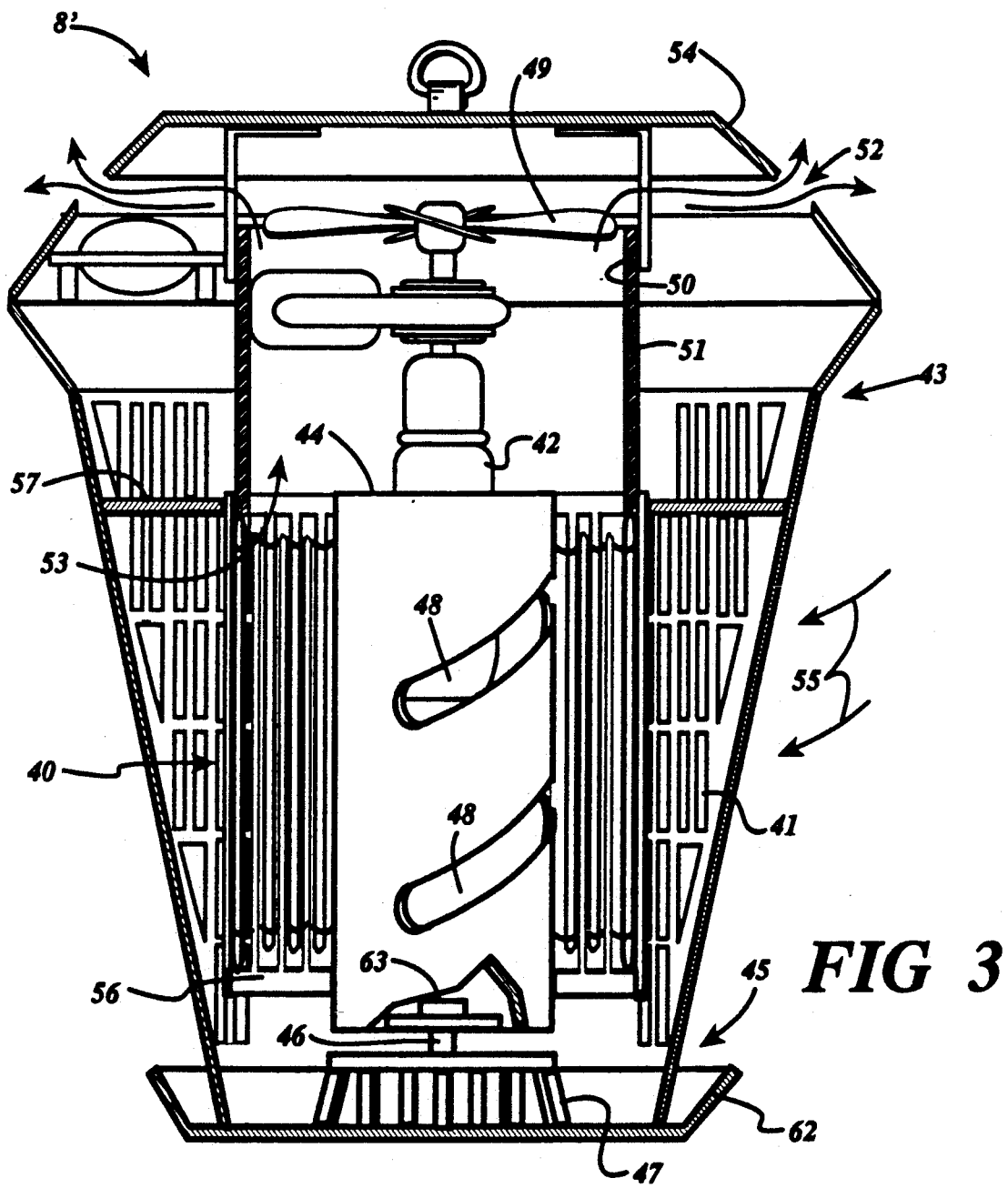
FIG. 3 is a longitudinal cross-sectional view taken through a modified form of the invention.

Turn next to FIG. 3 for a description of an alternative embodiment of the present invention. The embodiment 8' shown here also takes advantage of the upward flight reflex of mosquitoes in response to sensed changes in air flow direction and/or velocity. While it is known that insects are attracted to light, it is known that certain species of insects including mosquitoes are also attracted by heat, or infrared light, or by motion. The apparatus shown in FIG. 3 is an embodiment that provides visible light to attract insects, and also provides heat and motion to assist in attracting insects. It should be understood that the embodiment in FIG. 3 is exemplary of alternative mechanisms for attracting insects with heat, motion, and/or visible light, in various combinations, and should not be considered limited to the particular embodiment shown.

The alternative embodiment 8' of FIG. 3 includes an insect attracting assembly 40 made up of an angularly inclined protective wire mesh or grid 41 material through which mosquito-sized insects can pass. Thus, the assembly 40 comprises both an attracting means and an insect receiving means. Both functions will be discussed further hereinbelow. The mesh material 41 is here indicated as a reticulated plastic material, having a grid spacing in the range of about 0.375 inches to about 0.438 inches, which is sufficient to admit mosquitoes. Plastic or other insulating material is preferred for the mesh 41 since its principal purpose is to protect against accidental contact with an electrified grid and a rotating fan. Other materials will serve as well, the principal requirement being that the grid is sufficiently open to allow insects to sense the attracting means through the material and to pass therethrough.

The mesh assembly 41 is preferably larger in cross sectional area at the top 43 than at the bottom 45, thereby providing a shape which cants outwardly from the bottom up. Insects which approach the device from a lower altitude and fly upwardly will thus tend to pass into the area confined by the mesh assembly 41.

A light source 42 is positioned generally along the vertical centerline in the interior of the embodiment 8'. As shown in FIG. 3, the light 42 is a conventional, tubular, incandescent light bulb for emitting light in the visible spectrum and heat. As in the case of the embodiment shown in FIGS. 1 and 2, the bulb can include UV-enhancing phosphors, if desired. Both the light and the heat from the incandescence of the bulb 42 act as attractants for insects.

A rotating cylindrical sleeve 44 is mounted for rotation on a bearing 63. The sleeve, which surrounds the tubular bulb 42, is supported on a shaft 46 extending up from the bottom support 47. The sleeve 44 is therefore free to rotate when a force is applied. The sleeve 44 includes a plurality of slits 48 which extend helically around portions of the sleeve 44.

A fan 49 is mounted in a duct 50 above the sleeve 44, and above the light 42. The duct 50 is concentric with an enclosure 51 that terminates adjacent to the upper end of the sleeve 44. The fan 49 is of a type similar to that employed in the embodiment of FIGS. 1 and 2. Air enters the duct 50 through an air intake port 53, defined by the lower edge of the enclosure 51, positioned immediately above the top of the sleeve 44.

When the fan 49 rotates, air will be moved axially of the housing, from the area of the sleeve 44, into the intake port 53, through the enclosure 51 and the duct 50, to be discharged through a discharge slot 52 below a canopy 54. The air flow thus established causes air currents in the area of the sleeve 44 as indicated by the arrows 55, transversely to the housing. Air will flow from outside the device, through the mesh material 41 and into the sleeve 44 through the slits 48. Since the slits 48 are non-symmetrically oriented with respect to the sleeve 44, the air will exert unbalanced forces on the sleeve 44 and the sleeve will be caused to rotate. Rotation of the sleeve 44 alternately covers and uncovers portions of the light bulb 42, and provides motion for attracting insects.

Since the embodiment of FIG. 3 is primarily designed to serve as an insect electrocution device, an electric grid 56 is positioned between the mesh material 41 and the sleeve 44. The electric grid 56 comprises a plurality of spaced apart oppositely polarized bars, having a mesh size of between about 0.25 inches and about 0.31 inches so that mosquito-sized insects passing into the grid to approach the light will contact or come within operative proximity of oppositely charged bars and be electrocuted. Thus, the grid 56 in FIG. 3 is of a more conventional nature than the grid 20 in FIG. 2. As insects attempt to reach the attractants 42 and 44, the insects will be killed by the electric grid 56.

As in the embodiment shown in FIGS. 1 and 2, the embodiment 8' of FIG. 3 is operative to take advantage of the defensive upward flight reflex of mosquitoes. Insects such as mosquitoes will approach the mesh material 41, attracted by the attracting means comprising the light bulb 42 and rotating sleeve 44. The fan 49 sets up sufficient air current into the intake port 53 that any mosquitoes inside the mesh 41 will either be pulled into the air current or fly upwardly as a defensive measure and be pulled into a stronger air current. As the insects pass through the electric grid 56, they will be killed.

Still referring to FIG. 3, an annular plate 57 is provided on the interior of the mesh assembly 41, extending from the air intake port 53 outwardly to the mesh 41. The plate 57 defines an air flow directing means similar to that of the plate 13 in the embodiment of FIGS. 1 and 2. The plate defines a continuous surface extending from the mesh 41 to the air intake port 53, helps create a high velocity laminar air flow into the air intake port, and prevents the accumulation of upwardly flying insects. While the plate 57 is optional in the embodiment of FIG. 3, it is believed to be preferable.

The electric grid 56 for the embodiment 8' in FIG. 3 is larger and more extensive than the grid 20 of FIG. 2, but it is still desirable that insect remains not adhere to the grid. The grid 56 is constructed of two electrodes, each comprising a plurality of bars that extend substantially the length of the grid. The electrode bars are spaced apart with appropriate insulators (not shown) so that the electrode bars of one polarity alternate with the electrode bars of opposite polarity. Thus, an insect must simply contact or come within operative proximity of both of any two adjacent bars, and the insect will be killed. However the grid 56 remains sufficiently open that it is unlikely that an insect will become stuck on the grid.

As an insect is killed, it will either drop to a lower remains collection tray 62 or be carried into the fan and out through the discharge slot 52 with the current of air, depending of the mass of the remains.

It should be understood that the particular embodiments of the invention here presented are by way of illustration only, and are meant in no way to be restrictive. Therefore, numerous changes and modifications may occur to those skilled in the art and may be made, and equivalents resorted to, without departing from the spirit or scope of the inventions as set forth in the appended claims.

What is claimed is:

1. An insect attracting and capturing apparatus, comprising:
   a body;
   a light source for attracting insects to the vicinity of said body;
   means defining an insect-receiving opening in said body, said opening having an upper edge and a lower edge, said opening extending into the interior of said body;

a plate positioned above said light source for defining said lower edge of said opening;

a fan positioned within said body operative for creating an air flow outside said body in the vicinity of said opening and for drawing air in through said opening; and air flow directing means affixed to said body proximate to said upper edge and extending outwardly from said body to an outer rim, for capturing upwardly flying insects in said air flow and directing said insects into said opening.

2. The apparatus of claim 1, further comprising insect electrocution means positioned between said air flow directing means and said plate.

3. An electric insect killer, comprising:
a housing;
a circular light source for attracting insects;
said housing including an upper portion above said light source and a lower portion below said light source;
an insect receiving means for admitting insects into said housing;
a slot between said light source and said upper portion, said slot constituting said insect receiving means;
a plate above said light source for defining the lower edge of said slot;
a flange between said light source and said upper portion of said housing, said flange defining the upper edge of said slot and extending outwardly of said housing adjacent to said slot;
electric grid means located between said flange and said plate for killing insects admitted into said housing;
a fan within said housing for establishing a first, outwardly flowing air current generally axially within said housing; and
air flow directing means responsive to said first air current for generating a second, inwardly flowing air current exteriorly of said housing generally radially to said housing, said second air current being sufficient to pull insects that are in said second air current into said housing.

4. An electric insect killer as in claim 3, further comprising a transformer within said upper portion of said housing, said transformer providing power for electrifying said electric grid means and for lighting said light source.

5. An electric insect killer comprising:
a housing including an attractant portion for attracting insects;
a circular light source in said attractant portion, said light source emitting light for attracting insects;
an insect receiving portion for admitting insects into said housing;
said housing including an upper portion above said attractant portion, and a lower portion below said attractant portion;
a flange between said attractant portion and said upper portion of said housing;
a slot between said attractant portion and said upper portion, said slot constituting said insect receiving portion,
said flange defining the upper edge of said slot and extending beyond said housing adjacent to said slot;

a plate above said light source for defining the lower edge of said slot;
electric grid means for killing insects, said electric grid being located between said flange and said plate;
fan means within said housing for establishing a first air current generally axially of said housing, said first air current causing a second air current exteriorly of said housing perpendicular to said housing, said second air current being sufficient to pull weak flying insects that are in said second air current into said housing.

6. An electric insect killer as in claim 5, said fan means being within said lower portion of said housing, said first current of air being directed from said fan means downwardly through said lower portion, said second current of air being directed through said slot and into said fan means.

7. A combination outdoor lighting fixture and insect attracting and capturing apparatus, comprising:
a generally cylindrical body;
an annular light emitting means in said body for attracting insects to the vicinity of said body and for emitting light for illumination;
an annular insect receiving opening positioned on said body;
a fan mounted within said body for generating a flow of air into said insect receiving opening;
an annular flange on said body positioned for protecting said insect receiving opening and said light emitting means from rain and for directing air downwardly and outwardly of said body;
said insect receiving opening extending into a channel having a substantially uniform height extending from said insect-receiving opening to a position immediately above said fan;
a plate above said annular light emitting means for defining a lower surface of said channel;
said annular flange comprising a substantially continuous surface extending from an outer rim to said position immediately above said fan and defining at least one surface of said channel such that insects drawn into said opening are directed to the intake of said fan; and
electrocution means positioned in said channel between said flange and said plate for electrocuting insects passing through said channel.

8. An insect attracting and capturing apparatus, comprising:
a body;
means for attracting insects to the vicinity of said body;
means defining an insect-receiving opening in said body, said opening having an upper edge and a lower edge, said opening extending into the interior of said body, said opening being positioned above said attracting means;
a fan positioned within said body operative for creating an air flow outside said body in the vicinity of said opening and for drawing air in through said opening; and
air flow directing means affixed to said body proximate to said upper edge and extending outwardly from said body to an outer rim, for capturing upwardly flying insects in said air flow and directing said insects into said opening.

9. An electric insect killer, comprising:
a housing;

means for attracting insects positioned to emit exteriorly of said housing;

an insect receiving means positioned above said attracting means, for admitting insects into said housing;

electric grid means for killing insects admitted into said housing;

a fan within said housing for establishing a first, outwardly flowing air current generally axially within said housing; and air flow directing means responsive to said first air current for generating a second, inwardly flowing air current exteriorly of said housing generally radially to said housing, said second air current being sufficient to pull insects that are in said second air current into said housing.

10. An electric insect killer comprising:

a housing including an attractant portion for attracting insects;

an insect receiving portion positioned above said attractant portion for admitting insects into said housing;

electric grid means for killing insects;

fan means within said housing for establishing a first air current generally axially of said housing, said first air current causing a second air current exteriorly of said housing perpendicular to said housing, said second air current being sufficient to pull weak flying insects that are in said second air current into said housing.

11. A combination outdoor lighting fixture and insect attracting and capturing apparatus, comprising:

a generally cylindrical body;

an annular light emitting means in said body for attracting insects to the vicinity of said body and for emitting light for illumination;

an annular insect receiving opening positioned on said body above said light emitting means;

a fan mounted within said body for generating a flow of air into said insect receiving opening; and an annular flange on said body positioned for protecting said insect receiving opening and said light emitting means from rain and for directing air downwardly and outwardly of said body.

12. An insect attracting and capturing apparatus, comprising:

a body;

insect attracting means positioned to emit exteriorly of said body for attracting insects to the vicinity of said body;

an insect receiving opening positioned above said insect attracting means; and a fan mounted within said body for generating a flow of air into said insect receiving opening at a predetermined velocity within a predetermined range from said insect receiving opening sufficient to entrain small weak flying insects, whereby insects attracted to said insect attracting means that possess a defensive upward flight reflex in response to air currents will be captured in said flow of air into said insect receiving opening.

* * * * *